US012090455B2

(12) United States Patent
Dunnegan

(10) Patent No.: US 12,090,455 B2
(45) Date of Patent: Sep. 17, 2024

(54) AEROSOL CAN MIXING DEVICE

(71) Applicant: Ronald L. Dunnegan, DeWitt, IA (US)

(72) Inventor: Ronald L. Dunnegan, DeWitt, IA (US)

(*) Notice: Subject to any disclaimer, the term of this patent is extended or adjusted under 35 U.S.C. 154(b) by 19 days.

(21) Appl. No.: 17/470,514

(22) Filed: Sep. 9, 2021

(65) Prior Publication Data

US 2023/0072009 A1 Mar. 9, 2023

(51) Int. Cl.
*B01F 29/34* (2022.01)
*B01F 33/501* (2022.01)
*B01F 101/30* (2022.01)

(52) U.S. Cl.
CPC .......... *B01F 29/34* (2022.01); *B01F 33/5011* (2022.01); *B01F 2101/30* (2022.01)

(58) Field of Classification Search
CPC ... B01F 29/34; B01F 33/5011; B01F 2101/30
USPC .......................................................... 366/129
See application file for complete search history.

(56) References Cited

U.S. PATENT DOCUMENTS 4,209,259 A * 6/1980 Rains .................. B01F 33/4535 366/273
5,098,193 A * 3/1992 Christensen ........ B01F 27/1142 366/605
6,213,631 B1 * 4/2001 Miranda ................ B01F 31/40 366/349
D913,067 S * 3/2021 Dunn ............................. D7/412
2009/0161479 A1 * 6/2009 Blair ..................... B01F 35/422 366/130
2009/0193880 A1 * 8/2009 Halverson ............... B01F 31/20 422/400
2014/0084551 A1 * 3/2014 Brawley ................ B05B 15/25 279/140
2018/0199760 A1 * 7/2018 Rai ..................... A47J 43/0465
2018/0369766 A1 * 12/2018 Greene ................... B01F 29/31
2019/0031427 A1 * 1/2019 Dunn ................... B65D 1/0215

* cited by examiner

*Primary Examiner* — Marc C Howell
(74) *Attorney, Agent, or Firm* — SHUTTLEWORTH & INGERSOLL, PLC; Jason R. Sytsma

(57) ABSTRACT

An aerosol can mixer system includes an aerosol mixer device with a stem perpendicularly connected to a base, a housing integrally connected to the base on a side opposite the connection of the stem and at least one magnet connected to either the base or the housing. The at least one magnet is configured to releasably secure an aerosol can within the device. The stem is mounted to the base and is configured to be received by a handheld electrical device to permit rotating and mixing contents of the aerosol can.

19 Claims, 5 Drawing Sheets

AEROSOL CAN MIXING DEVICE

FIELD

The present application relates to devices for mixing the contents of aerosol cans, and more specifically to devices for mixing paint cans.

BACKGROUND

Aerosol spray can contents settle during storage. In order to mix the contents, the cans are generally either placed into a paint shaker or manually shaken for several minutes. If cans are not mixed thoroughly, product is left in the can resulting in waste and additional costs. However, both using a paint shaker or manually shaking have downsides, paint shakers can be costly and manual shaking is time consuming and tiring. Devices have been developed for utilizing common household tools, such as a reciprocating saw, to mix the contents of these aerosol cans, but these devices can be unwieldy, expensive, cumbersome to use or contain parts that are easy to misplace. Further, loading and unloading the aerosol can into the device can be time consuming, thus increasing the time needed to complete a project. Therefore, a need still exists for an inexpensive, easy to use aerosol can mixing tool.

SUMMARY

Exemplary embodiments of the present disclosure include various embodiments of an aerosol can mixing device as well as a method of using the same. The device includes an attachment for a rotatable handheld electrical device comprising a rigid base coupled to a stem perpendicularly oriented relative to a plane of the base; a rigid housing integrally connected to the base, wherein the rigid housing has an opening adapted to fit an aerosol can; and at least one magnet connected to the base, wherein the magnet is adapted to releasably secure the aerosol can, further wherein the stem is configured to be mounted within a handheld electrical device to permit the device to rotate the aerosol can for mixing contents of the aerosol can. In different embodiments, the rigid base is made of steel, ABS plastic, or aluminum. The magnet can be a circular or donut shaped ceramic magnet.

Also disclosed is a method of mixing the contents of an aerosol can using the disclosed device wherein the device contains an aerosol can and is secured to a rotatable handheld electrical device which rotates the aerosol can.

Further areas of applicability will become apparent from the description. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Further aspects of the various embodiments will be understood from the following description.

In various embodiments of the present disclosure, a device is provided for attachment to an aerosol can to permit mixing of its contents. The various embodiments comprise a device that generally includes a base coupled to a stem perpendicularly oriented relative to the base and a housing perpendicularly oriented relative to a plane of the base and an integral magnet. The magnet is configured to releasably engage an end portion of an aerosol can such that the aerosol can remains within the housing when the stem is mounted and rotated.

Figure 1B:
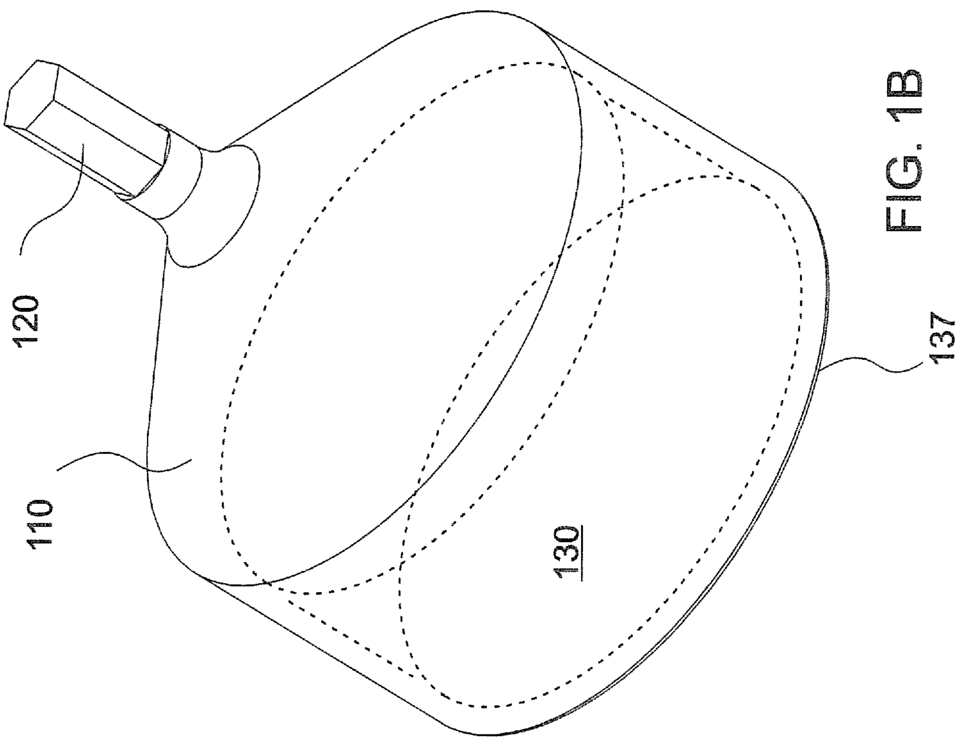
FIG. 1B is a bottom perspective view of a second embodiment of an aerosol can mixing device.
Figure 1A:
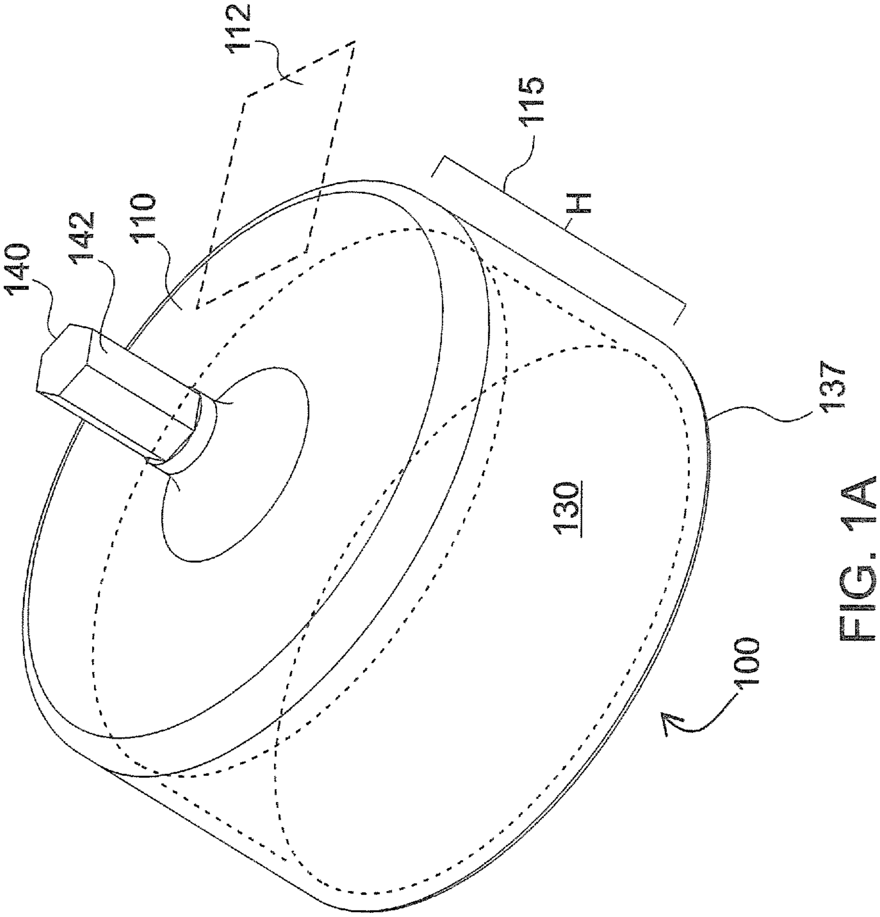
FIG. 1A is a bottom perspective view of a first embodiment of an aerosol can mixing device.
Figure 1C:
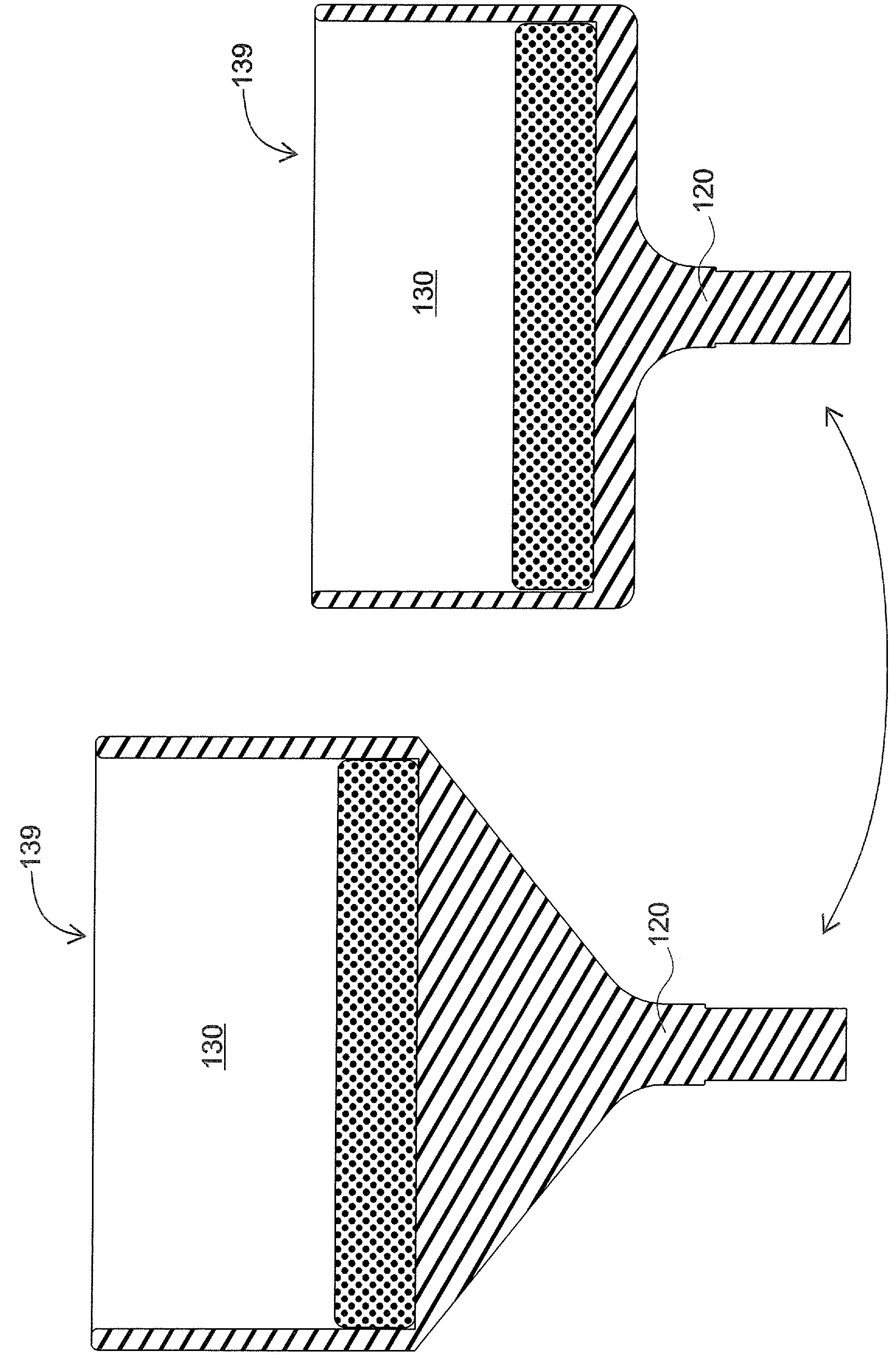
FIG. 1C is a cross sectional view of the embodiments of FIG. 1A and FIG. 1B.

Referring to FIG. 1A and FIG. 1B, a first and second embodiment of a device 100 for releasable attachment of an aerosol can to permit mixing of contents is provided. Device 100 includes a base 110 having plane 112 coupled to a stem 120, where stem 120 is perpendicularly oriented relative to plane 112. Device 100 further includes a housing 130 integrally connected with base 110 and perpendicularly oriented relative to plane 112. In many embodiments, base 110 and housing 130 are a single piece. FIG. 1C demonstrates a cross section of the embodiments and differing base 110 shapes of the embodiments in FIG. 1A and FIG. 1B.

The base 110 shown in FIG. 1A and FIG. 1B is made of a rigid material, and comprises a generally circular shape. Examples of rigid materials include steel, aluminum, and ABS plastics. As the skilled artisan understands, different materials can provide different advantages. For example, the use of steel generally allows for a thinner base and housing. In one embodiment, the diameter of base 110 is 2.655 inches. However, neither the size nor shape of base 110 are meant to be limiting. For example, the size of base 110 can be the diameter of any type of metal spray paint can, such as mini spray paint cans or the cans used with automotive lubricant, and the shape can be square or rectangular to accommodate different sized and shaped aerosol cans. Housing 130 is generally made from the same material as base 110 although in different embodiments, base 110 may be a different material than housing 130. In one embodiment, the bottom shape of housing matches the shape of base 110. As demonstrated by FIG. 2, the top shape of housing 137 may match the shape and size of base 110 or may be a different shape or larger.

Top shape of housing 137 comprises an opening 139 for receiving the end portion of an aerosol can. The distance of this opening from base 110 can vary. In one embodiment, the distance is about 1½ inches. In another embodiment, the distance is about 1 inch. In yet another embodiment, the distance is about 2 inches. As is understood by the skilled artisan, the distance from opening 139 to base 110 generally describes height 115 of housing 130. Opening 139 may be sized such that it can receive a standard sized 12 oz aerosol paint can. Most aerosol cans contain a small lip at the bottom. Opening 139 will generally be sized such as to provide a secure grip along this lip. Some embodiments include an insert that fits into opening 139 for smaller cans. Inserts can be made of any appropriate material. In one embodiment, the insert (not shown) is a piece of PVC bushing.

Figure 2B:
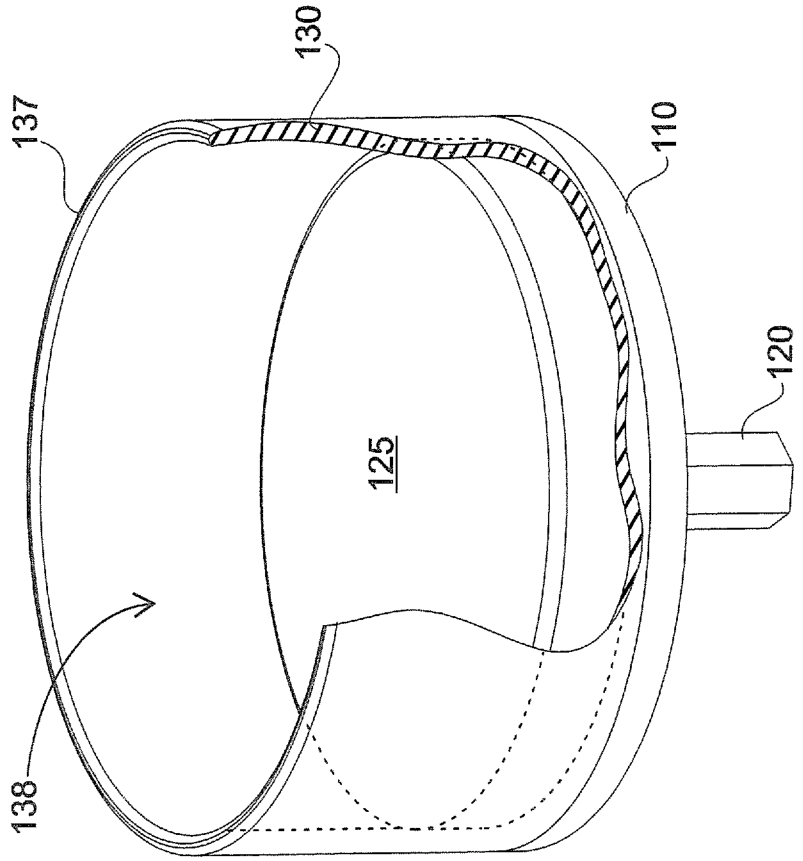
FIG. 2B is a cutaway view of the embodiment of the aerosol can mixing device of FIG. 2A.
Figure 2A:
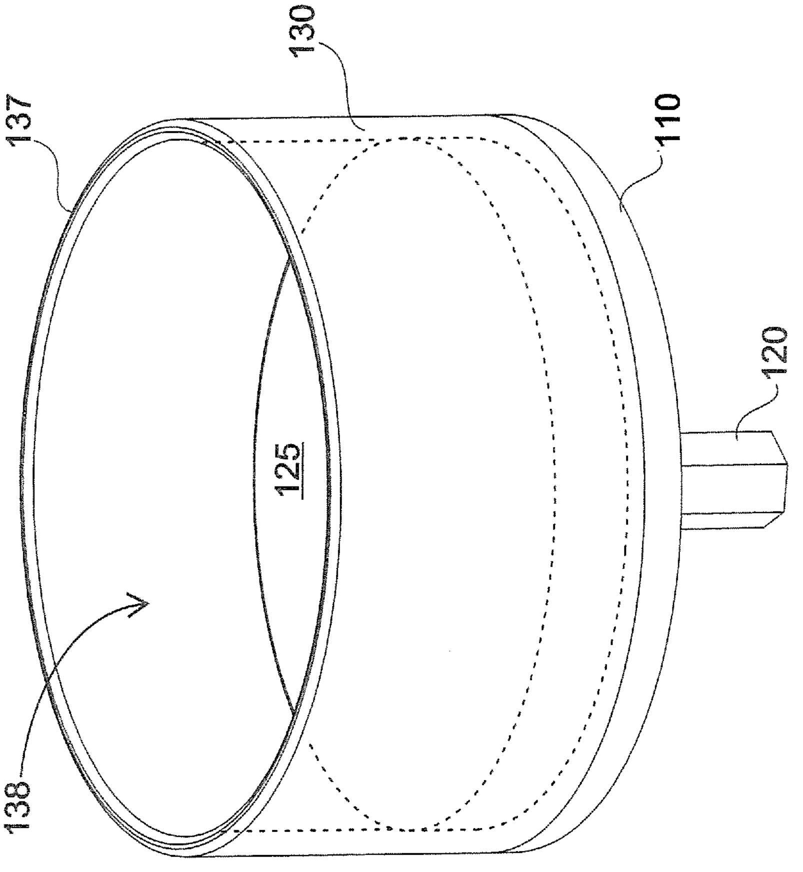
FIG. 2A is a top perspective view of the aerosol can mixing device base with a round magnet.
Figure 3:
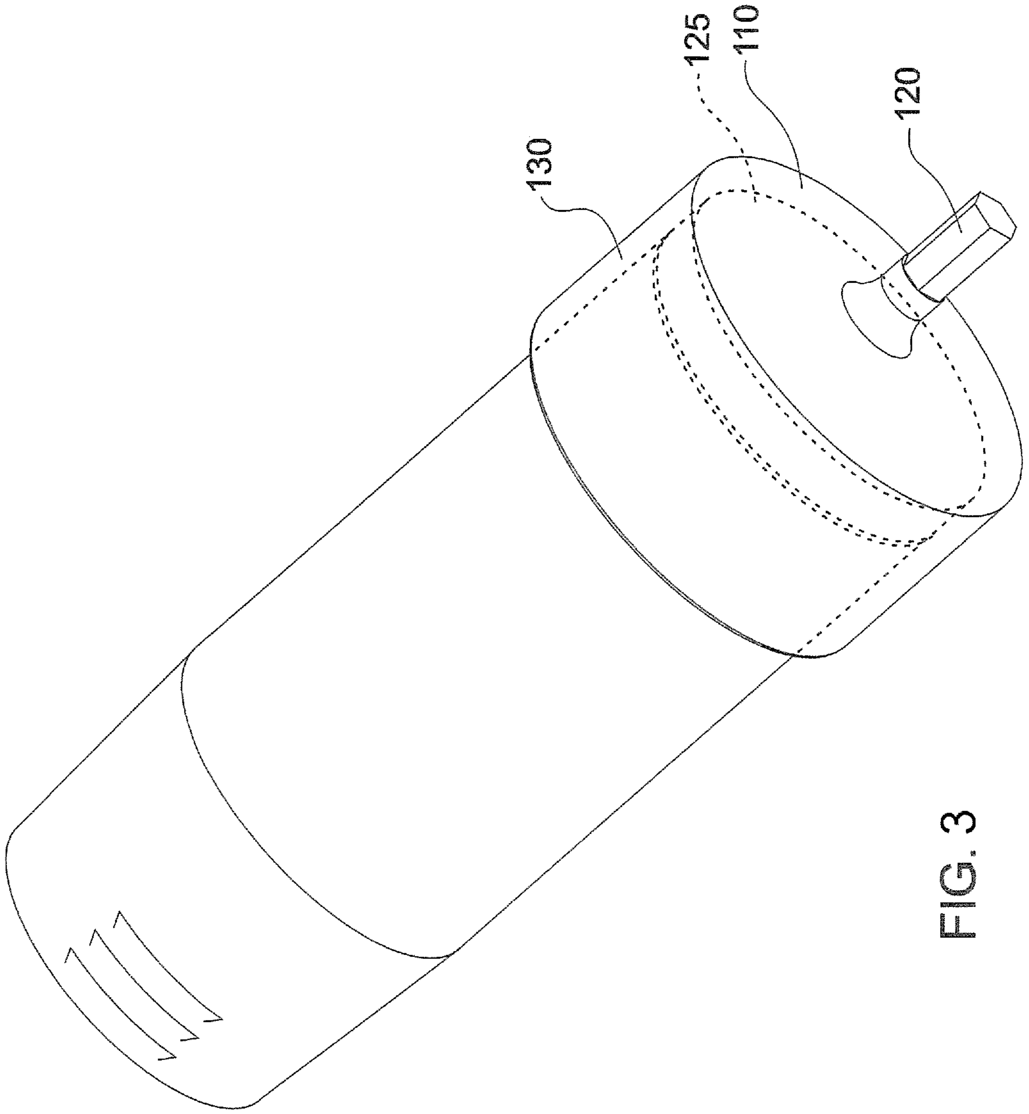
FIG. 3 is a side perspective view of the aerosol can mixing device containing an aerosol can.

Magnet 125, can be any of a number of different types of magnets. For example, magnet 125 may be a commercially available ceramic round base magnet with 65 lbs of pull. These magnets may be nickel or nickel/chrome plated for additional durability. In another embodiment, the magnet will be a rare earth magnet, such as neodymium. Other types of permanent magnets, such as alnico are also contemplated. In some instances, such as those where commercially available ceramic round magnets are used, magnet 125 will be within a housing. Magnet 125 must just be strong enough, either through type or size, to keep an aerosol can from detaching while it is being rotated in the device but weak enough that the aerosol can be easily removed. In the device shown in the Figures, such as FIG. 2, magnet 125 is circular, with a diameter of 2.64 inches and a thickness of 0.375 inches thick. In the embodiment of FIG. 2, magnet 125 is permanently attached to base 110 through glue. Nevertheless, in different embodiments, magnet 125 will be square, donut, or rectangular shaped and have different thicknesses. Donut shaped magnets can be particularly useful when used in the disclosure because they allow for easy attachment, such as with a center hex bolt. In yet other embodiments, magnet 125 is a plurality of magnets.

Stem 120 may be a shank of a dimensional size that is appropriate for common electrical hand drills and impact drivers. In FIG. 1A, stem 120 is perpendicularly attached to the center of bottom of base 110. In contrast, in FIG. 1B, stem 120 has an additional funnel shaped component where the outer edge of the upper funnel shape component is connected to the bottom circumference of base 110. Stem 120 may coupled to base 110 in a generally centered position, such as that shown in the Figures. Stem 120 may be a "quick release" hex-shaped drill-bit type shank 140 commonly seen on powered hand drill accessories, as shown in FIG. 1A. A "quick release" hex-shaped drill-bit type drive shank 140 has a grooved portion 142 for retaining device 100 within rotatable handheld electrical device such as a drill chuck. In other embodiments, stem 120 is a straight shank, SDS shank, triangle shank, morse taper shank, square shank or threaded shank. In most embodiments, stem 120 and base 110 are an integral piece. However, it is contemplated that stem 120 may also be coupled to base 110 through fasteners such as screws or rivets.

Figure 4:
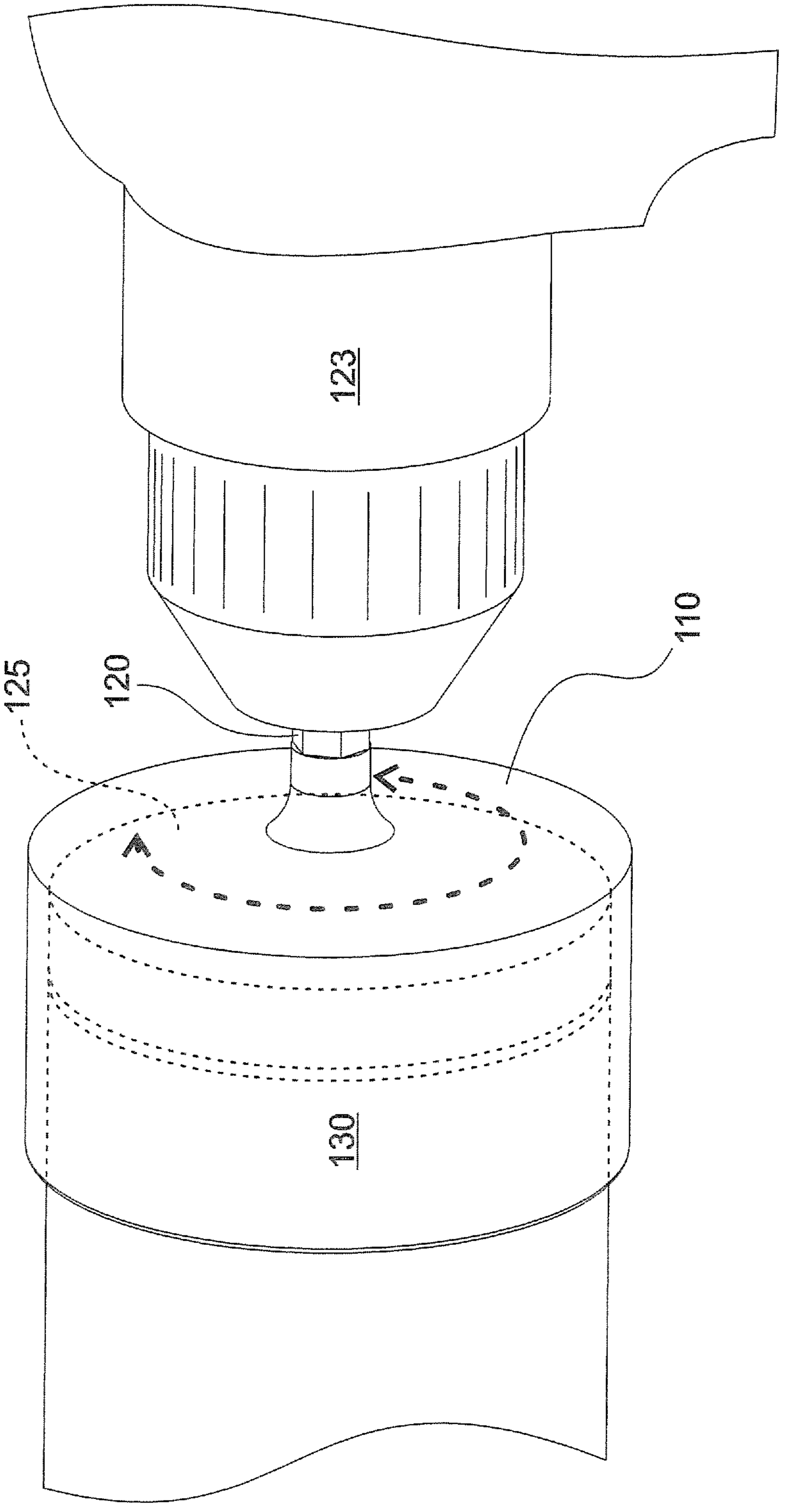
FIG. 4 is a side perspective view of the aerosol can mixing device containing an aerosol can with the stem mounted within a chuck of a rotatable handheld electrical device.

In use, the end of an aerosol can is positioned against magnet 125 in base 110 within housing 130. Once magnet 125 has secured the aerosol can within device 100, stem 120 is mounted within a chuck 123 as shown in FIG. 4, to permit device 100 to rotate the aerosol can and mix its contents. In a different embodiment, an aerosol can is secured after stem 120 is already mounted within chuck 123. In yet additional embodiments, such as when an impact driver is used, chuck 123 will be substituted with a clamp, such as a quick change clamp. Once the can has been secured in the device, the user turns on the method of rotation. Angling the rotatable handheld electrical device up and down in a vertical manner while rotating further helps to mix the can contents. Generally rotating the can and angling the rotatable handheld electrical device up and down for about 20-30 seconds is adequate to fully mix the can contents.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A device comprising:

a. a rigid base coupled to a stem perpendicularly oriented relative to a plane of the base;

b. a rigid housing integrally connected to the base, wherein the rigid housing has an opening adapted to fit an aerosol can; and c. at least one magnet connected to the base, wherein the magnet is adapted to releasably secure the aerosol can, further wherein the stem is configured to be mounted within a handheld electrical device to permit the device to rotate the aerosol can for mixing contents of the aerosol can, and wherein the magnet is placed on an interior surface of the rigid base within the rigid housing and is circular in diameter approximately equal to the interior of the rigid housing.

2. The device of claim 1 wherein the rigid base and the rigid housing have a same outer shape.

3. The device of claim 1 wherein the rigid base is made of aluminum.

4. The device of claim 1 wherein the rigid base is made of ABS plastic.

5. The device of claim 1 wherein the rigid base is made of steel.

6. The device of claim 1 wherein the at least one magnet is a ceramic magnet.

7. The device of claim 1 wherein the at least one magnet is circular.

8. The device of claim 1 wherein the at least one magnet is donut shaped.

9. The device of claim 1 wherein the at least one magnet has a diameter of 2.64 inches.

10. The device of claim 1 wherein the at least one magnet is 0.375 inches thick.

11. The device of claim 1 wherein the stem is funnel shaped.

12. The device of claim 1 wherein one end of the stem is a quick release electric drill-bit type shaft.

13. The device of claim 1, wherein the stem is generally centered on a bottom of the base.

14. The device of claim 1, wherein one end of the stem is a hex-shaped drill bit shafted with a groove for retaining the shaft within a handheld electrical device chuck.

15. The device of claim 1 wherein the handheld electrical device is a rotatable hand-held electric drill.

16. A method of mixing the contents of an aerosol can comprising:

securing an aerosol can within the device of claim 1;

securing the device of claim 1 to a rotatable handheld electrical device; and rotating the aerosol can with the rotatable handheld electrical device.

17. The method of claim 16 further comprising:

moving the rotatable handheld electrical device in a vertical manner.

18. The method of claim 16 wherein the aerosol can is rotated with the rotatable handheld electrical device for about 30 seconds.

19. A device comprising:

a. a rigid base coupled to a stem perpendicularly oriented relative to a plane of the base and a conical section formed between the rigid base and the stem with the conical section tapering in diameter from an outer surface of the rigid housing to the stem;

b. a rigid housing integrally connected to the base, wherein the rigid housing has an opening adapted to fit an aerosol can; and c. at least one magnet connected to the base, wherein the magnet is adapted to releasably secure the aerosol can, further wherein the stem is configured to be mounted within a handheld electrical device to permit the device to rotate the aerosol can for mixing contents of the aerosol can.

* * * * *